Aug. 15, 1961   K. TAKAOKA   2,996,071
GAS REGULATOR VALVE FOR ARTIFICIAL RESPIRATION
Filed May 13, 1957

INVENTOR
*KENTARO TAKAOKA*

BY Dean Lawrence

ATTORNEY

United States Patent Office 2,996,071
Patented Aug. 15, 1961

2,996,071
GAS REGULATOR VALVE FOR ARTIFICIAL RESPIRATION
Kentaro Takaoka, Rua Gaspar Lourenco No. 1-C, Sao Paulo, Brazil
Filed May 13, 1957, Ser. No. 658,847
Claims priority, application Brazil Jan. 3, 1957
3 Claims. (Cl. 137—63)

This invention relates to a gas regulator valve for artificial respiration. The valve of the present invention by virtue of its characteristics which have been tested in practical operation provides a perfect control of the aspiration and expiration phases of artificial respiration without being subject to mechanical troubles and inconveniences which might cause a pressure different from the one desired for a predetermined case.

Figure 1:
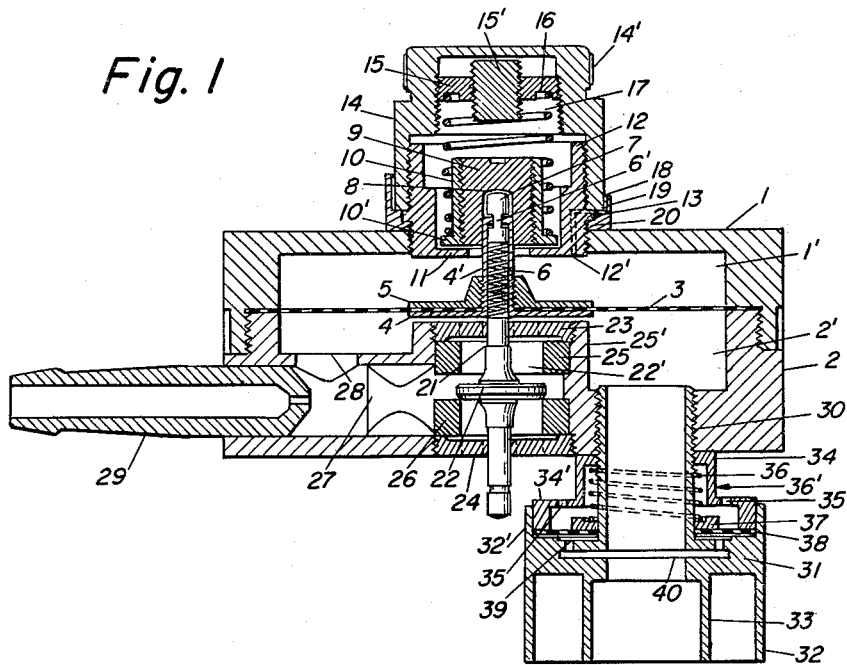
Figure 2:
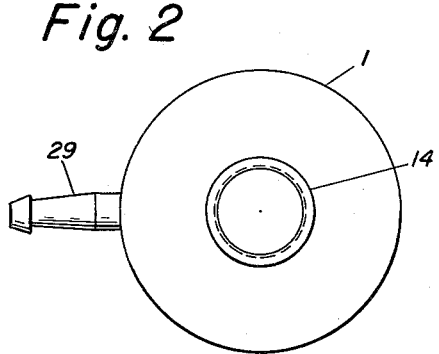
Figure 3:
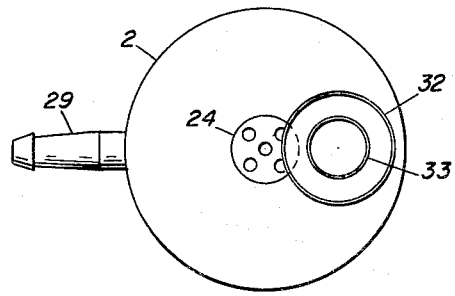

For a better illustration of the present invention, reference is made to the drawings attached hereto in which FIG. 1 shows a view in vertical cross section of the subject valve; FIG. 2 shows a top plan view of the valve of FIG. 1; and FIG. 3 shows a bottom plan view of the valve of FIG. 1.

Referring now to the drawings, the body of the gas regulator valve comprises a cylindrical metal container or housing composed of upper and lower halves 1 and 2 which are in screw threaded engagement with each other. A circular rubber membrane or diaphragm 3 is secured between the abutting surfaces of the upper and lower halves 1 and 2 of the valve housing. The diaphragm 3 divides the interior of the valve housing into top and bottom chambers 1' and 2', respectively. The central portion of diaphragm 3 is secured between lower and upper metal disks 4 and 5, respectively. The lower disk 4 has integral therewith a hollow cylindrical-shaped projection 4' which extends through a centrally located aperture in diaphragm 3. The upper disk 5 is screwed down onto the lower end of cylindrical projection 4' and into engagement wtih the upper surface of diaphragm 3. A coil spring 6 is positioned within the hollow interior of the projection 4', spring 6 being connected at its upper end to a dowel pin 6' which extends through an opening in the top wall of cylindrical projection 4'. The upper end of dowel pin 6' projects above the top end of cylindrical projection 4' and is indicated at 7.

The upper end of the cylindrical projection 4' and the end 7 of dowel pin 6' are received within an orifice 8 of an otherwise solid cylinder 9. Cylinder 9 is ensheathed in a cylindrical sleeve-like cover 10 having screw threads on its interior surface which engage corresponding screw threads on the outer surface of cylinder 9. Cover 10 of cylinder 9 includes a base flange 10' the lower surface of which is adapted to engage the upper surface of inwardly extending flange 11 of a cylindrical-shaped member 12. The outer surface of member 12 is in screw-threaded engagement with a central opening in the top wall of the upper half 1 of the valve casing.

A short distance above the bottom flange 11, the cylindrical-shaped member 12 is provided with an outer flange 13 which acts as downwardly limiting stop for the hollow adjusting cap 14 of the spring housing. The upper end of adjusting cap 14 is knurled as indicated at 14'.

In order to regulate the tension of the coil spring 17 positioned within the interior of cap 14, the interior wall surface of cap 14 is threaded adjacent the upper end thereof and a disk 15 is in threaded engagement with the threaded inner wall surface of member 14. Disk 15 is provided on its under surface with a peripheral groove 16 which receives the upper end of coil spring 17. The spring 17 extends downwardly and surrounds the outer surface of the cylindrical cover 10 of cylinder member 9, with the lower end of the spring 17 resting on the upper surface of flange 10' of cylindrical cover 10.

Disk 15 is provided with a central threaded aperture which receives a threaded pin or plug 15'. The lower end of pin 15' is free while the upper end thereof touches the under or inner surface of the top wall of adjusting cap 14. The rotation of adjusting cap 14 determines the axial position of disk 15 to permit regulation of the compression of coil spring 17.

A metal ring 19 is provided with a countersunk flange 20 which lies between the under surface of flange 13 of cylindrical member 12 and the upper surface of the top wall of valve housing section 1. The upper peripheral wall surface of ring 19 is recessed to provide a small radial clearance 18 between ring 19 and the adjacent surface of the adjusting cap 14. The cylindrical member 12 is provided with a discharge orifice 12' which connects the interior of upper chamber 1' with the clearance 18 between ring 19 and the adjacent surface of adjusting cap 14, thereby constantly connecting the interior of upper chamber 1' to atmosphere pressure.

The lower end of coil spring 6 within the cylindrical projection 4' is fixed to a vertical pin 21 which has connected thereto a steel valve disk 22 having perfectly polished contact surfaces which cooperate with valve seats to be hereinafter described for allowing or stopping gas flow through the valve. The pin member 21 which carries valve disk 22 is guided for movement by two flat guide disks 23 and 24, respectively, which are axially spaced from each other relative to the longitudinal axis of pin 21, plates 23 and 24 being fixed to the lower body 2 of the valve housing inside the housing. Two magnetized rings 25 and 26 are respectively positioned adjacent the guide plates 23 and 24, the planes of the respective magnetized rings 25 and 26 lying parallel to the planes of the guide plates 23 and 24. The valve disk 22 carried by shaft 21 is positioned between the two ring members 25, 26. Valve disk 22 moves within a chamber 22' bounded by upper and lower guide disks 23 and 24 and by the surrounding wall portion 25' within the interior of lower housing section 2. The upper guide plate 23 and the adjacent magnetic ring 25 define a gas flow path to the lower chamber 2' of the valve housing; the lower plate 24 and its corresponding magnetic ring 26 define an exhaust path to the exterior of the valve housing.

A gas or air injector 29 extends into the interior of lower housing section 2 at one side thereof. Axially aligned with the air or gas injector 29 is a venturi passage 27 which communicates with the chamber 22' within which valve disk 22 moves. An aspiration orifice 28 connects the interior of lower chamber 2' with the path of gas flow between the inlet end of injector member 29 and the venturi passage 27 leading to chamber 22'. Aspiration orifice 28 and venturi passage 27 cooperate to define a gas ejecting means during the exhaling or expiration phase of the artificial respiration.

At the opposite side of the valve housing section 2 to that to which injector 29 is connected, an outlet tube 30 extends into communication with the interior of chamber 2, the end of tube 30 being in screw threaded engagement with the lower end of valve housing section 2. A short distance below its connection to valve housing section 2, tube 30 is provided with an enlarged hollow internal cross section bounded by wall portion 33. An outer wall portion 32 of still greater diameter is coaxial with wall 33, the walls 32 and 33 being joined by transverse wall portion 31.

A jacket or sleeve generally indicated at 36' is positioned coaxially about the tube 30 adjacent the connection of tube 30 to valve housing section 2, the jacket 36' including an inner wall portion 34 which extends parallel to the axis of tube 30 and in slightly spaced relation to the outer surface of tube 30, and an outer wall portion 34' of larger diameter which is received within the flange-like extension 32' of wall 32. A transverse wall portion connects the radially inner and outer walls 34 and 34' of the jacket 36' and includes an orifice 35 through which excess gas pressure inside tube 30 may be relieved. A passage 39 communicates the interior of tube 30 with the space beneath a flexible membrane or packing 38 interposed in the path of discharge outlet 35, membrane or packing 38 being normally biased by spring 36 to a position in which the packing prevents fluid communication between orifices 39 and 35. The lower end of spring 36 bears against a ring or spring seat 37 which bears against the upper surface of membrane 38. The membrane 38 is so dimensioned and so located relative to orifice 39 that if the pressure inside tube 30 becomes excessive so as to be dangerous to the patient, the pressure communicated from the interior of tube 30 through orifice 39 raises the membrane or packing 38 against the pressure of spring 36 to a position in which gas flow is communicated from orifice 39 to discharge outlet 35, thereby relieving the pressure inside tube 30.

Description of operation

In the position of valve disk 22 shown in FIG. 1, the valve disk engages lower magnetic ring 26 and closes the exhaust passage to the exterior of the valve housing. When compressed gas, air or oxygen is injected through the injection passage 29, the gas enters the chamber 22' through the venturi passage 27, the gas passing from chamber 22 into chamber 2 through the passage bounded by the top magnet ring 25. The inlet gas can also pass from inlet 29 to lower chamber 2' through the aspiration orifice 28. Gas reaching lower chamber 2' then passes to the patient by means of the outlet tube 30, thus performing the aspiration phase of the artifical respiration.

As the pressure increases in chamber 2 with the continued supply of gas through outlet tube 30, the pressure raises the diaphragm 3 against the pressure of control spring 17 and in so doing pulls the coil spring 6 upwardly until a point is reached where the pull of spring 6 overcomes the attractive force of the lower magnet ring 26 upon valve disk 22, causing the valve disk 22 to move upwardly with a snap movement into engagement with the upper magnet ring 25. The movement of valve disk 22 out of engagement with the lower magnet ring 26 opens the exhaust passage to the exterior of the valve housing. With the exhaust passage open, the incoming gas from injector 29 passes through venturi passage 27 and to the exhaust opening bounded by magnet ring 26. In passing through venturi passage 27, the gas from injector 29 produces a suction through the aspiration orifice 28 which draws air from chamber 2' and causes it to pass outwardly through the exhaust passage. Thus aspiration orifice 28 and venturi passage 27 together constitute a gas ejecting means during the expiration or exhalation phase of the artificial respiration cycle. The respiration movement frequency is controlled by air vent 12' of top chamber 1', since the return of the membrane 3 to its neutral position depends on the air returning thereto through the orifice 12'.

It can be seen from the foregoing that there is provided in accordance with this invention a respiration device of great practical and economic value, having improved operational charactersistics.

While there has been shown and described a particular embodiment of the invention, it will be obvious to those skilled in the art that various changes and modifications may be made in the invention without departing from the invention and, therefore, it is aimed to cover all such changes and modifications as fall within the true spirit and scope of the invention.

In the claims:

1. A gas regulator valve for artificial respiration comprising a hollow valve body, a flexible diaphragm extending across the interior of said valve body and dividing the interior of said valve body into a first chamber and a second chamber, a third chamber, a gas inlet means, means connected between said inlet means and the interior of said third chamber for ejecting gas directly from said second chamber in response to gas flow from said inlet means to the exterior of said valve body, an outlet passage communicating with the interior of said second chamber, a pair of ring-like magnetic valve seats mounted in axially spaced relation to each other in said third chamber, one of said valve seats providing an exhaust passage to the exterior of said valve body, the other of said valve seats communicating said third chamber with said second chamber, a magnetic valve closure member reciprocable to alternately form a substantially gas sealing engagement with the two valve seats, said valve closure when in engagement with said one valve seat closing the exhaust passage and permitting gas flow through said other valve seat and said second chamber to said outlet passage for the inhalation phase of respiration and when in engagement with said other valve seat opening the exhaust passage of said one valve seat to permit gas flow from said second chamber and said inlet means through said ejector means for the exhalation phase of respiration, said valve closure member being mounted on a valve stem positioned for reciprocation coaxially of said ring-like magnetic valve seats, said valve stem being connected to said flexible diaphragm for movement therewith, spring means yieldingly urging said valve closure member to a position engaging one of said magnetic valve seats, increased pressure within said second chamber being effective to move said flexible diaphragm to move said valve closure member away from said one magnetic valve seat and into magnetic engagement with the other magnetic valve seat.

2. A gas regulator valve for artificial respiration as defined in claim 1 in which said spring means is positioned on the same side of said diaphragm as said first chamber, and including stop means engaging said spring means to limit the movement of said spring means in the direction of said second chamber.

3. A gas regulator valve for artificial respiration comprising a hollow valve body, a flexible diaphragm extending across the interior of said valve body and dividing the interior of said valve body into a first chamber and a second chamber, a third chamber, a gas inlet means, means connected between said inlet means and the interior of said third chamber for ejecting gas directly from said second chamber in response to gas flow from said inlet means to the exterior of said valve body, an outlet passage communicating with the interior of said second chamber, a pair of ring-like magnetic valve seats mounted in axially spaced relation to each other in said third chamber, one of said valve seats providing an exhaust passage to the exterior of said valve body, the other of said valve seats communicating said third chamber with said second chamber, a magnetic valve closure member reciprocable to alternately form a substantially gas sealing engagement with the two valve seats, said valve closure when in engagement with said one valve seat closing the exhaust passage and permitting gas flow through said other valve seat and said second chamber to said outlet passage for the inhalation phase of respiration and when in engagement with said other valve seat opening the exhaust passage of said one valve seat to permit gas flow from said second chamber and said inlet means through said ejector means for the exhalation phase of respiration, said valve closure member being mounted on a valve stem positioned for reciprocation coaxially of said ring-like magnetic valve seats, first spring means connecting said valve stem to said flexible diaphragm, and second spring means yieldingly urging said valve closure member to a position engaging one of said magnetic valve seats, increased pressure within said second chamber being effective to move said flexible diaphragm to move said valve closure member away from said one magnetic valve seat and into magnetic engagement with the other magnetic valve seat.

References Cited in the file of this patent

UNITED STATES PATENTS

| | | |
|---|---|---|
| 2,071,215 | Petersen | Feb. 16, 1937 |
| 2,353,740 | Malone | July 18, 1944 |
| 2,536,435 | Fox | Jan. 2, 1951 |
| 2,736,331 | Seeler | Feb. 28, 1956 |
| 2,774,352 | Emerson | Dec. 18, 1956 |